United States Patent [19]
Miller et al.

[11] Patent Number: 5,644,461
[45] Date of Patent: Jul. 1, 1997

[54] HIGH VOLTAGE D-C CURRENT LIMITER

[75] Inventors: Craig A. Miller, Pittsburgh; Joseph C. Fray, Turtle Creek, both of Pa.

[73] Assignee: Westinghouse Air Brake Company, Wilmerding, Pa.

[21] Appl. No.: 688,556

[22] Filed: Jul. 30, 1996

Related U.S. Application Data

[63] Continuation of Ser. No. 366,486, Dec. 30, 1994, abandoned.

[51] Int. Cl.[6] .............................. H02H 9/00; H01H 7/00
[52] U.S. Cl. .............................. 361/56; 361/106; 338/21; 338/22 R; 338/49; 338/320
[58] Field of Search .............................. 361/54–57, 11, 361/13, 103, 106, 111; 338/20–23, 48–49, 320

[56] References Cited

U.S. PATENT DOCUMENTS

| | | | |
|---|---|---|---|
| 4,967,176 | 10/1990 | Horsma et al. | |
| 5,227,944 | 7/1993 | Eggendorfer | 361/103 |
| 5,294,852 | 3/1994 | Straker | |
| 5,379,022 | 1/1995 | Bacon et al. | 338/20 |
| 5,379,176 | 1/1995 | Bacon et al. | 361/106 |
| 5,513,059 | 4/1996 | Atkins | 361/56 |

*Primary Examiner*—Jeffrey A. Gaffin
*Assistant Examiner*—Michael J. Sherry
*Attorney, Agent, or Firm*—James Ray & Associates

[57] ABSTRACT

A current limiter for protecting a circuit at a predetermined driving voltage in excess of 50 volts which includes a plurality of PTC resistors connected in series, with a zener diode connected in parallel with each of the PTC resistors, and wherein each of the PTC resistors has a predetermined voltage capacity limit such that the total of the predetermined capacity limits of the PTC resistors exceeds the predetermined driving voltage, and each of the zener diodes has a zener voltage rating less than the predetermined voltage capacity limit of the individual PTC resistor connected in parallel therewith, and the total of the zener voltage ratings of the zener diodes also exceed the predetermined driving voltage.

13 Claims, 1 Drawing Sheet

HIGH VOLTAGE D-C CURRENT LIMITER

CROSS-REFERENCE TO RELATED APPLICATION

This application is a continuation of patent application Ser. No. 08/366,486, filed Dec. 30, 1994, now abandoned.

FIELD OF THE INVENTION

This invention relates generally to circuit protecting current limiters, and more particularly to new and unique, solid state, circuit protecting current limiters that can function as permanent, self-resetting fuses or self-resetting circuit breakers, and can function at any desired, predetermined voltage level. In addition, this invention relates to a protecting current limiter for 74-volt circuits powered by a 74 volt, d-c, railroad locomotive power system supplied by an auxiliary generator or battery.

BACKGROUND OF THE INVENTION

Polymer based positive temperature coefficient resistors (PTC resistors) are well known in the art, and are finding increasing use in a great variety of applications for protecting low voltage electrical circuits from the flow of excessive currents, much like a fuse or a circuit breaker. Some of the polymer based PTC resistors are sold commercially under the registered trademark "PolySwitch" by Raychem Corporation, 300 Constitution Drive, Menlo Park, Calif., and utilize one of several conductive polymer compounds which have an exceptionally low level of resistance to electrical flow at ambient or normal operating temperatures, and in which the electrical resistance increases quite abruptly and dramatically upon an increases in temperature. As utilized to protect an electrical circuit, the circuit's electrical current is directed through the PTC resister at normal current levels, which will readily flow therethrough, providing exceptionally little electrical resistance to the flow as long as the temperature remains below a given value, which is an inherent characteristic of the particular polymer used, and is appropriately selected for the particular application of use. When the current increases above a predetermined, normal operating current level, as a result of voltage surge, a fault or any other cause, the temperature of the PTC resistor, i.e., the conductive polymer, is caused to increase beyond its inherent threshold limit, which thereby causes the electrical resistance to increase quite abruptly and dramatically, to very significantly reduce the flow of electrical current through the resistor, and virtually "trip" the circuit. While such tripping action does not in fact "open" the circuit to literally stop the flow of current as in the case of a normal fuse or circuit breaker, the increase in resistance is so abrupt, dramatic and significant that the flow of current is so significantly reduced that for all intents and purposes, the flow of current is virtually stopped. As a result, the circuit is protected from any possible damage as though the current flow had been completely interrupted, so that the PTC resistor does function much like a fuse or circuit breaker. When the temperature of the polymer is reduced back to the normal operating temperatures, the low resistance is again restored, and normal current flow is resumed. That is to say, once the fault has been corrected, or has corrected itself, so that the resistor's temperature will return to normal levels, the low resistance therethrough is restored, and accordingly, the PTC resistor automatically resets itself, so that operation of the circuit will immediately resume. The trip time can be as short as 0.1 second, and the electrical characteristics of the polymers, or PTC resistors, do not change significantly with repeated cycling through the critical temperature range; i.e., through the low resistance/high resistance transformations. This self-resetting feature has been shown to be a significant advantage in many applications, such as personal computers and peripheral equipment, telephones, battery packs, small motors in automobiles, and so on, in that in the event the circuit is tripped, there is no need to replace a fuse or reset a circuit breaker, and accordingly, no need for a costly service call if the equipment user is not sufficiently skilled to replace a fuse or reset a circuit breaker.

One disadvantage of state-of-the-art polymer PTC resistors, is that all are limited to operation at voltage levels of below about 60 volts. That is to say, none of the PTC resistors available commercially are capable of functioning as intended at voltage levels above about 50 to 60 volts. While differing PTC resistors are commercially available for differing types of applications, and classified to meet differing voltage and current requirements, none are commercially available for use in circuits where the driving voltage will, in normal operation, exceed about 60 volts. Accordingly, for those circuits normally expected to operate at voltage levels in excess of 60 volts, there are no polymer PTC resistors available that can provide over-current protection at such voltage levels, and the circuit designer must rely on conventional fuses or circuit breakers, and cannot therefore, take advantage of the automatic, self-resetting feature of PTC resistors.

U.S. Pat. No. 4,967,176, issued Oct. 30, 1990, and assigned on its face to Raychem Corporation, teaches and claims a sub-circuit assembly in which a plurality of PTC resistors are connected in series to provide a sub-circuit assembly which can be utilized at voltages higher than the voltage limits of the individual PTC resistors in the assembly. The patent acknowledges that it is known to connect a plurality of PTC resistors in parallel to achieve an overall current carrying capacity equal to the sum of the individual PTC resistors. The patent further acknowledges that while it is theoretically known to connect a plurality of PTC resistors in series to achieve an overall voltage limit equal to the sum of the voltage limits of the individual PTC resistors, that this result cannot in fact be achieved except for a very short period of time. Specifically, it is theorized that this result could be effected only if the resistors are exacting identical and all exposed to exactingly identical thermal environments, which is a condition virtually impossible to achieve and maintain. Indeed, even the smallest difference in electrical characteristics or thermal environments, under a fault condition, will certainly cause one of the PTC resistors to heat and thereby dramatically increase its resistance. Rather than tripping the circuit, however, the transformed PTC resistor will thereby shoulder nearly the entire voltage by itself and fail by melting or otherwise destroying the PTC resistor. Nevertheless, the patent teaches that such an increase in voltage capacity can be made to work for a rather short limited time, which may be useful in some applications where a slightly delayed response to an over-load condition to trip the circuit may be useful. The patent goes on to teach and claim a number of such applications where such a slight delay in tripping time can be used to an advantage. As an example, the patent teaches the use of such PTC resistors connected in series, used in combination with a conventional circuit breaker, so that the PTC resistors will carry the electrical current during the rather short interval of time while the circuit breaker contacts are moving apart as a result of a tripped circuit, to thereby avoid arcing or sparks before the contacts are fully separated. This, and none of the other disclosed applications, however, in any way contemplate the use of the PTC resistors connected in series solely for the purpose of protecting against over-current at higher voltage levels, as indeed, such protection could only be achieved for a very short period of time, as noted above. Accordingly, there remains a need for solid state, circuit protecting devices or current limiters that can function as do PTC resistors, but at driving voltage levels in excess of 50 to 60 volts.

SUMMARY OF THE INVENTION

This invention is predicated upon a new and unique sub-circuit system or current limiter that utilizes a plurality of PTC resistors connected in series such that the assembly system will have an overall voltage capacity equal to the sum of voltage capacity limits of the PTC resistors, and which is not time limited in any way whatsoever. Furthermore, there is no need that the PTC resistors be identical or even similar in nature, form or chemistry, or that they all be subjected to the same thermal environments. The current limiter of this invention can utilize as many PTC resistors in series as necessary to achieve whatever blocking voltage capacity is desired, and can be incorporated within virtually any system or circuit to function as a self-resetting fuse or circuit breaker without any concern for time limitations. Accordingly, the current limiter of this invention can be utilized as are conventional, independent PTC resistors to protect virtually any desired circuit from overload condition, which includes the self-resetting feature, and which can be adapted for use at virtually any desired voltage level.

In particular, the current limiter of this invention has found particular utility in combination with 74 volt, d-c, railroad locomotive power systems and circuits, which are utilized to operate most of the locomotive control systems, such as the electronic air brake and throttle control, as well as other locomotive systems and circuits.

In essence, the current limiter, or sub-circuit system of this invention involves the use of a plurality of PTC resistors connected in series, wherein each PTC resistor is individually connected in parallel with a zener diode, with each zener diode having a zener voltage less that the predetermined voltage capacity limit; i.e., break-down voltage, of the PTC resistor connected in parallel therewith. The current limiter system will have an overall voltage capacity limit substantially equal to the sum of the voltage capacity limits of all the zener diodes in the assembly system, which may approach the sum of the voltage limits of all the PTC resistors in the series.

As is well known in the art, a zener diode is an electronic device, solid state or otherwise, which is capable of passing an electrical current in a given direction only when the voltage across the zener diode equals the rated zener voltage for that particular zener diode. Currents will not pass through the zener diode if the voltage across it is below the zener voltage. It is also well known that, to the extent a current is conducted across a zener diode by virtue of the fact that the voltage exceeds the zener voltage, that there will be a voltage drop across the zener diode equal to the zener voltage. Zener diodes have long been available commercially in a plurality of forms and rated at practically any zener voltage one may choose. An ordinary zener diode is one that is unidirectional, that is to say, it will block passage of currents when the voltage potential across it is below the zener voltage rating of the zener diode in only one direction, namely the zener direction, while in the opposite direction, electrical currents can flow as through a conventional diode.

By incorporating the plurality of zener diodes in parallel with the plurality of PTC resistors, the total voltage limit of the combination will be equal to the sum of the zener voltages of the individual zener diodes in the series, with each zener diode serving as a by-pass for the PTC resistor in parallel therewith, without any need that any two or more of the PTC resistors or any two or more of the zener diodes be identical or be exposed to identical thermal environments. This is because each zener diode will serve to carry the current in the event the associated PTC resistor in parallel therewith is tripped, and at the same time serves to limit the blocking voltage by a value equal to the zener voltage. If the diode's zener voltage is exceeded, it will pass the current therethrough, even though the voltage may be sufficient to trip one or more of the other PTC resistors in the series. As each PTC resistor trips, namely, transforms to its high resistance state, the current will be diverted through the associated zener diode in parallel therewith. The plurality of PTC resistors in the series will in fact normally trip, successively diverting the current flow through successive zener diodes thereby eventually reducing the impressed voltage to a level insufficient to exceed the voltage rating of least one remaining PTC resistor.

Normally, at the inception, when the electric current is first applied through the inventive current limiter assembly, the current will be conducted through the PTC resistors in series due their exceptionally low resistance, as though the zener diodes were not there. As noted above, this situation cannot be long lasting as very quickly, at least one of the PTC resistors will surely heat sufficiently to cause it to trip; i.e., transform to the high resistance state. When this happens, the current flow will in essence be diverted through the zener diode in parallel therewith, with an associated voltage drop across the zener diode equal to the zener voltage. Conceivably, another, or a second, PTC resistor may be heated sufficiently to cause it also to trip, and accordingly, the current flow diverted through the zener diode in parallel therewith, namely a second zener diode, again with an associated voltage drop across that zener diode equal to its zener voltage. If the voltage drop across the two or more such current conducting zener diodes is sufficient to reduce the remaining voltage to a level below the breakdown voltage of any one or more untripped PTC resistor remaining, then the one or more remaining PTC resistors can readily block the current at that remaining voltage. Obviously, a properly sized protective assembly i.e., current limiter, will have a plurality of zener diodes in series with a total zener voltage equal to, and preferably greater than any expected driving voltage, normal or fault.

OBJECTS OF THE INVENTION

The primary object of this invention is to provide a new and novel current limiter for protecting circuits from over-current conditions at any predetermined voltage level.

Another primary object of this invention is to provide a new and novel automatic, self-resetting, solid state, circuit protecting, current limiter for protecting circuits from over-current conditions at any predetermined voltage level, and particularly voltages in excess of 50 volts.

Still another object of this invention is to provide a new and novel, PTC resistor assembly system that can be utilized to protect circuits from over-current conditions at voltage levels in excess of 50 volts.

An additional object of this invention is to provide a new and novel, PTC resistor assembly system that can be utilized to protect circuits from over-current conditions at voltage levels in excess of 50 volts that is not time limited.

A further object of this invention is to provide a new and novel, PTC resistor assembly system that can be utilized to protect circuits from over-current conditions at voltage levels in excess of 50 volts that does not require the use of identical PTC resistors, and does not require the PTC resistors to be subjected to the same or similar thermal environments.

Still another object of this invention is to provide a new and novel resistor set comprising a PTC resistor and a zener diode connected in parallel, whereby a plurality of such resistor sets are intended to be connected in series for the purpose of assembling a high voltage, direct current, current limiter.

An even further object of this invention is to provide a new and novel current limiter system for protecting 74 volt, d-c, railroad locomotive systems and circuits, including electronic air brake control circuits and throttle control circuits, and virtually any other circuit included within a locomotive.

These and other objects and advantages of this invention will become apparent from a better understanding of the following detailed description of the invention, particularly when viewed in conjunction with the following drawings.

DESCRIPTION OF THE PREFERRED EMBODIMENTS OF THE INVENTION

Figure 1:
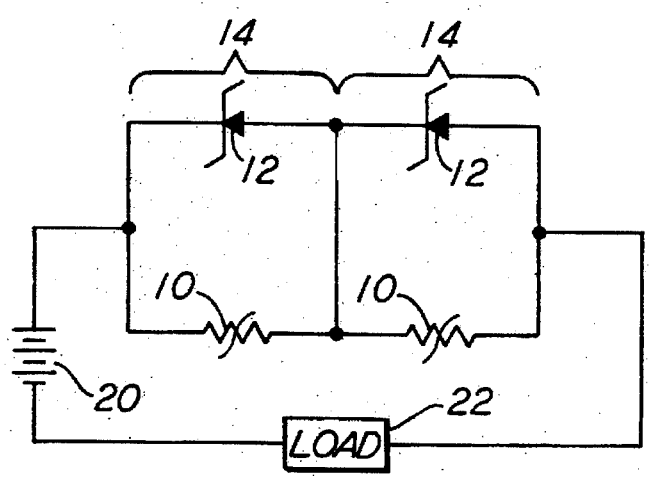
FIG. 1 is a circuit diagram of a most basic embodiment of this invention, showing two PTC resistors connected in series, with a zener diode connected in parallel with each PTC resistor.

Prior to proceeding with a detailed description of the subject invention, it is noted that for the sake of clarity, identical components which have identical functions have been identified with identical reference numerals throughout the several views of the attached drawings.

Reference to FIG. 1 will illustrate the most basic embodiment of the unique current limiter system of this invention having two PTC resistors 10 and two zener diodes 12. As can be seen, one each of the PTC resistors 10 is connected in parallel with one each zener diode 12, to provide two resistor sets 14. The resistor sets 14, are connected together in series, to form a circuit protecting assembly; i.e., an inventive current limiter 16, as an example of a rather basic and simple embodiment of this invention, wherein the current source is shown at 20, and the circuit load shown at 22.

For most normal applications, it is preferred, although not essential, that the PTC resistors 10 should be selected to be as identical as possible, having the same voltage capacity limits and having the same trip current limit, which should be the trip current limit desired for the circuit to be protected, so that either one or more of the PTC resistors will trip should the current therethrough exceed the trip current rating. Obviously, each individual PTC resistor 10 will have to have the capacity to carry the full current levels expected for the circuit connected thereto. Since the PTC resistors are connected in series, there is no additive effect of the current carrying capacity, so that each PTC resistor must be selected to have the capacity to carry any expected pass current. This is a simple matter of merely selecting PTC resistors having current capacity limits that will carry the expected pass current, and will trip if the expected pass current is exceeded. Indeed, PTC resistors are commercially available which are rated to pass current levels as high as 100 amperes, which should be more than ample for most applications.

With regard to voltage, on the other hand, if the circuit's pass voltage is intended to be less than 50–60 volts, one can obviously use a single PTC resistor to protect the circuit pursuant to prior art techniques, without any need for the unique current limiter of this invention. As noted above, however, it is not possible to select a single PTC resistor capable of blocking an electric current at voltages above about 50–60 volts, nor is it possible to merely connect a plurality of PTC resistors in series to enhance the voltage capacity. This invention will be useful only if the driving voltage directed to the circuit is expected to exceed 50–60 volts, and accordingly, the individual voltage capacity limits of the plural PTC resistors should be such that the combined total voltage limits of all PTC resistors connected in series should exceed the maximum expected driving voltages applied to the circuit. For example, if the driving voltage is approximately 80 volts, and it is desired that the current limiter should trip in the event the voltage should surge to levels of say for example, 100 volts, then the PTC resistors 10 in the system depicted in FIG. 1; i.e. the system having two PTC resistors 10, should have a voltage capacity limit of at least about 50 volts each, so that the sum thereof should at least be 100 volts, a value matching the hypothetical 100 volt trip limit.

On the other hand, the zener voltage rating of each zener diodes 12, must be slightly less that the blocking voltage rating of the PTC resistors 10 connected in parallel therewith, so that in the absence of a fault condition, the electrical current will, at least initially, pass through each PTC resistor 10, rather than the zener diode 12 connected in parallel therewith. The sum of the zener voltages for all the zener diodes 12, should exceed the maximum driving voltage. In this way, either zener diode 12 will protect its associated PTC resistor 10 from over-voltage conditions.

Figure 2:
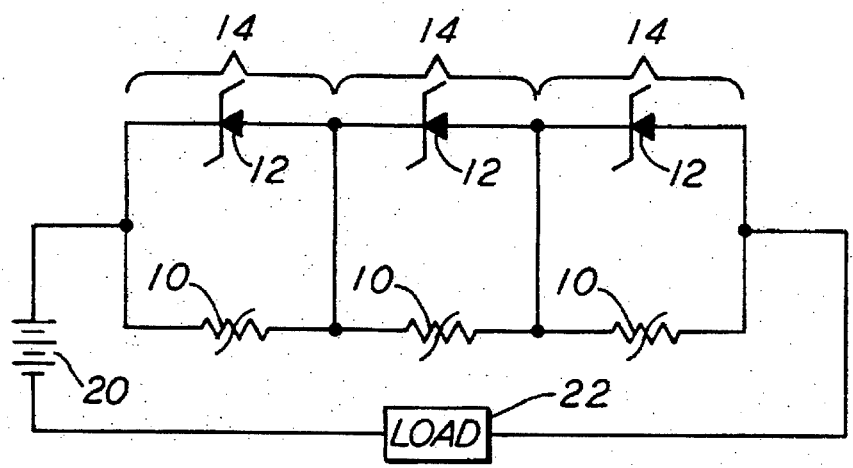
FIG. 2 is a circuit diagram of a currently more preferred embodiment of this invention, showing three PTC resistors connected in series, with a zener diode connected in parallel with each PTC resistor, as an example of an assembly system to protect a circuit at voltages up to about 100 volts.

FIG. 2 illustrates an alternate and more preferred embodiment of the inventive current limiter having three PTC resistors 10 and three zener diodes 12. As can be seen again, one each PTC resistor 10 is connected in parallel with one each zener diode 12, to provide three of the resistor sets 14, connected in series. Normally, the use of at least three resistor set 14 is preferred to assure adequate protection.

With reference to FIG. 2, it should be again apparent that in normal operation, or at least at start-up, the electric current will pass through the three PTC resistors 10 connected in series, as though the zener diodes 12 were not there. This is because, as disclosed above, each zener diode 12 should have a zener voltage less that the voltage rating of the PTC resistor connected in parallel therewith. Indeed, as long as any particular PTC resistor 10 is conducting the electric current therethrough at or below its voltage limit, the voltage in that resistor set 14 will not equal the zener voltage for that particular zener diodes 12 in parallel therewith, and hence it functions as though it were not even there, and the electric current will not pass through the zener diodes 12 if in fact the current is passing through the PTC resistor 10 connected in parallel therewith. When the rated trip current of the PTC resistor is exceeded, the PTC resistors 10 will heat, causing that PTC resistor to "trip"; i.e., transform to the high resistance state. When this happens, the zener voltage for that particular resistor set 14 will be exceeded, and the current flow will by-pass that particular PTC resistor 10, which has transformed to its high resistance state, and instead pass through the zener diode 12 connected in parallel therewith. As previously noted, however, there will be a voltage drop across that zener diode 12 equal to the zener voltage, so that the downstream voltage will be equal to the driving voltage reduced by the zener voltage. If a second PTC resistor 10 should similarly trip, then the current will be diverted through the zener diode 12 associated therewith, with another voltage drop, so that the downstream voltage will equal the driving voltage reduced by the two zener voltages. With the use of three resistor sets 14, as depicted in FIG. 2, it is intended that during normal operation, in the absence of a fault condition, that no more than two PTC resistors 10 can be conditioned to trip. This is because when two PTC resistors 10 are tripped with the current by-passed through the associated zener diodes 12, the total voltage drop across the two zener diodes 12 will be sufficient to reduce the applied voltage to the PTC resistor 10 remaining to a value within its capacity limit, so that remaining PTC resistor will be capable of blocking the remaining voltage. If a fault condition should occur, such as a short circuit, the remaining PTC resistor 10 will of course trip. But since the blocking voltage at that point is below the zener voltage of the remaining zener diode 12, the current will not by-pass through that zener diode 12, but instead, the current flow will virtually stop, to protect the circuit as intended.

After a PTC resistor 10 has tripped, it is conceivable that its temperature could cool, transforming the tripped PTC resistor 10 back to the low resistance state whereby the current will again pass therethrough instead of the zener diode 12. This could cause a switching back and forth which would not damage the system, with the result that as long as current remains within the normal expected range, the current will pass through the resistor sets 14, with a possible switching back and forth through the PTC resistor 10 and zener diode 12 as a function of the temperature of the PTC resistors 10.

The current carrying capability of the zener diodes 12 used should be capable of handling any expected fault current on a short term basis. If the circuit of fault source impedance is such that with varying voltage burdens, the source impedance changes significantly, care must be exercised to ensure selected zener diodes will be able to dissipate power defined by slightly less than the PTC trip current times the zener voltage. This is an unusual circumstance and would not be expected in normal circumstances.

As already stated, the PTC resistors 10 should preferably be selected to be as identical as possible, having the same voltage capacity limits and having the same trip current limit, which should be the trip current limit desired for the circuit to be protected. As explained above, the over-all current limiter will trip only after all but one of the PTC resistors 10 has tripped to divert the current through the zener diode 12 associated therewith. If one cannot determine which of the PTC resistors 10 will be the last one remaining to protect the circuit, it becomes apparent that all should have the same trip current so that the over-all current limiter will trip at the trip current so that regardless of which is the last remaining PTC resistor 10, the trip current will be the same. Since the trip current should be the same, it becomes a simpler task to design a current limiter if all the electrical properties of the PTC resistors 10 and all the zener diodes 12 are identical. Nevertheless, situations could be present wherein one may wish to use non-identical components, as for example to control the sequence of tripping PTC resistors. Since the primary purpose of utilizing a current limiter of this invention is to be able to permit higher driving voltages, it is advantageous to utilize PTC resistors 10 having relatively high voltage capacity limits, such as those having voltage capacity limits of 30 to 60 volts, for the purpose of minimizing the total number of PTC resistors 10 that will have to be utilized.

Figure 3:
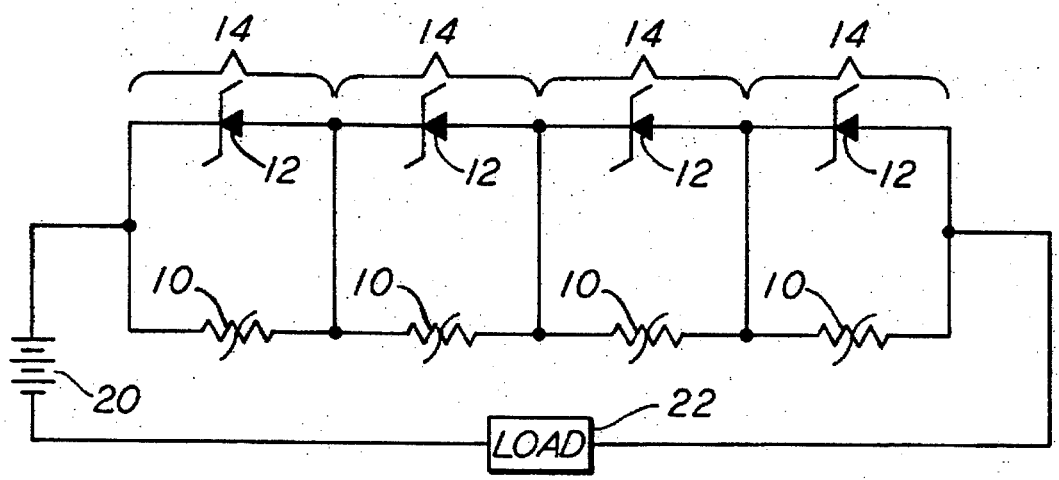
FIG. 3 is a circuit diagram similar to that shown in FIG. 2, but utilizing four PTC resistors having a 45 volt capacity as an example of an assembly system to protect a typical 74 volt railroad locomotive circuit system intended to protect circuits which may be exposed to voltages of as much as 135 volts d-c on a periodic basis.

As an example of the subject invention in use in a practical application, a railroad locomotive having a conventional 74 d-c power supply is normally provided with fuses or circuit beakers on the various systems operated by the main power supply. That is to say, the power supply is provided by auxiliary generators driven by the locomotive diesel engines, and the electric current generated is passed through a voltage regulator which convert it to at 74 volts, direct current. This current is utilized to operate a number of different systems, including the locomotive interconnect, the electronic air brake control circuits, the throttle control circuits, and virtually any other circuit included within a locomotive. To protect these circuits, current limiters of this invention have been developed which utilize three or four resistor sets as depicted in FIGS. 2 and 3. As shown, the three PTC resistors 10 are selected to have a voltage capacity of 50 volts, and a current capacity of one amp. The zener diodes 12 connected in parallel therewith are selected to have a zener voltage of no more than about 45 volts. As depicted in FIG. 3, the power source 20 provides a constant voltage of 74 volts, d-c. When the current is first applied, it will pass through the line of PTC resistors 10 connected in series with little voltage drop, while the zener diodes 12 at that point will conduct no current. When the circuit current exceeds one amp, one of the PTC resistors 10 will heat and trip, so that the current is diverted through the associated zener diode 12. For purposes of illustration, it will be assumed that it is the middle PTC resistor 10 that first trips, so that after tripping, the current passes through the first PTC resistor 10, the second zener diode 12 and then through the third PTC resistor 10. Because of the voltage drop across the second zener diode 12, the third PTC resistor will only see a voltage of 29 volts (74 volts–45 volts). Since the zener diode is not a current limiting device, the fault current in excess of one amp may remain and pass through the first and third PTC resistor 10, so that another of these PTC resistors 10 will trip. Assuming for purposes of illustration that this time the first PTC resistor 10 is the second one to trip, and the remaining voltage is 29 volts, the remaining PTC resistor 10 would solely be capable of blocking the fault current, and its associated zener diode 12 would remain in an "off" condition. Since this 29 volts is within the capacity range of the third PTC resistor, it should be capable of the applied current without tripping, unless a fault condition occurs, which will trip the entire system as intended. Any additional devices; i.e., resistor sets 14, are provided for protection of the circuit should driving voltage exceed 74 volts under extraordinary conditions. The absolute maximum driving voltage expected under conditions where the protected circuit is expected to function properly must be less than that of the sum of all zener voltages.

Having described three embodiments of the subject invention, it should be apparent that a number of modifications could be incorporated and other embodiments developed without departing from the spirit of the invention.

I claim:

1. A current limiter for protecting a circuit within a railroad locomotive subject to a predetermined driving voltage ranging from 50 to approximately 135 volts d-c, said current limiter comprising; a plurality of PTC resistors connected in series, a zener diode connected in parallel with each of said PTC resistors, each of said PTC resistors having a predetermined voltage capacity limit such that the total of said predetermined capacity limits of said PTC resistors exceeds said predetermined driving voltage, each of said zener diodes having a zener voltage rating less than said predetermined voltage capacity limit of said PTC resistor connected in parallel therewith, and such that the total of said zener voltage ratings of said zener diodes also exceeds said predetermined driving voltage.

2. A current limiter for protecting a circuit according to claim 1 in which said PTC resistors have substantially the same predetermined voltage capacity limits, and said zener diodes have substantially the same zener voltage ratings.

3. A current limiter for protecting a circuit according to claim 1 in which at least three PTC resistors are utilized each connected in parallel with a zener diode.

4. A current limiter for protecting a circuit according to claim 3 in which said at least three PTC resistors have substantially the same predetermined voltage capacity limits, and said zener diodes have substantially the same zener voltage ratings.

5. A current limiter for protecting a circuit according to claim 3 in which said at least three PTC resistors have substantially the same predetermined voltage capacity limits within the range of 30 to 60 volts.

6. A resistor set for use in assembling a current limiter for protecting a circuit within a railroad locomotive subject to a predetermined driving voltage ranging from 50 to approximately 135 volts d-c, said resistor set comprising; a PTC resistor connected in parallel with a zener diode, said PTC resistor having a predetermined voltage capacity limit, and said zener diode having a zener voltage rating less that said predetermined voltage capacity limit of said PTC resistor, said resistor set intended to be connected in series with at least one other such resistor set to produce a current limiter.

7. A resistor set for use in assembling a current limiter for protecting a circuit at a predetermined driving voltage in excess of 50 volts according to claim 6 in which said PTC resistor has a predetermined voltage capacity limit within the range of 30 to 60 volts.

8. A 74 volt circuit system in a railroad locomotive having a circuit protecting current limiter to protect said circuit system from voltage surges up to approximately 130 volts d-c, said current limiter comprising; at least three PTC resistors connected in series, a zener diode connected in parallel with each of said PTC resistors, each of said PTC resistors having a predetermined voltage capacity limit such that the total of the predetermined capacity limits of the PTC resistors exceeds 74 volts, each of said zener diodes having a zener voltage rating less than said predetermined voltage capacity limit of said PTC resistor connected in parallel therewith, and such that the total of the zener voltage ratings of the zener diodes also exceeds 74 volts.

9. A 74 volt circuit system in a railroad locomotive having a circuit protecting current limiter according to claim 8 in which said PTC resistors have substantially the same predetermined voltage capacity limits, and said zener diodes have substantially the same zener voltage ratings.

10. A 74 volt circuit system in a railroad locomotive having a circuit protecting current limiter according to claim 8 in which at least three PTC resistors are utilized each connected in parallel with a zener diode.

11. A 74 volt circuit system in a railroad locomotive having a circuit protecting current limiter according to claim 10 in which said at least three PTC resistors have substantially the same predetermined voltage capacity limits, and said zener diodes have substantially the same zener voltage ratings.

12. A 74 volt circuit system in a railroad locomotive having a circuit protecting current limiter according to claim 10 in which said at least three PTC resistors have substantially the same predetermined voltage capacity limits within the range of 30 to 60 volts.

13. A 74 volt circuit system in a railroad locomotive having a circuit protecting current limiter according to claim 10 in which said at least three PTC resistors have substantially the same predetermined voltage capacity limits of approximately 50 volts, and said zener diodes have substantially the same zener voltage of approximately 45 volts.

* * * * *